US008728228B2

(12) United States Patent
Schumacher et al.

(10) Patent No.: US 8,728,228 B2
(45) Date of Patent: *May 20, 2014

(54) HIGH-GLOSS MULTILAYER EFFECT PIGMENTS HAVING A NARROW SIZE DISTRIBUTION, AND METHOD FOR THE PRODUCTION THEREOF

(75) Inventors: Dirk Schumacher, Pegnitz (DE); Michael Grüner, Auerbach (DE); Günter Kaupp, Neuhaus (DE)

(73) Assignee: Eckart GmbH (DE)

( * ) Notice: Subject to any disclaimer, the term of this patent is extended or adjusted under 35 U.S.C. 154(b) by 66 days.

This patent is subject to a terminal disclaimer.

(21) Appl. No.: 13/143,386

(22) PCT Filed: Aug. 9, 2010

(86) PCT No.: PCT/EP2010/004864
§ 371 (c)(1),
(2), (4) Date: Jul. 14, 2011

(87) PCT Pub. No.: WO2011/020569
PCT Pub. Date: Feb. 24, 2011

(65) Prior Publication Data
US 2011/0265690 A1    Nov. 3, 2011

(30) Foreign Application Priority Data

Aug. 19, 2009    (DE) .................. 10 2009 037 932

(51) Int. Cl.
*C04B 14/20*    (2006.01)
(52) U.S. Cl.
USPC ............................ 106/417; 106/415; 427/214
(58) Field of Classification Search
None
See application file for complete search history.

(56) References Cited

U.S. PATENT DOCUMENTS

| 4,128,435 A | 12/1978 | Bäumer et al. |
| 5,958,125 A | 9/1999 | Schmid et al. |

(Continued)

FOREIGN PATENT DOCUMENTS

| DE | 19525503 A1 | 1/1997 |
| DE | 19953655 A1 | 5/2001 |

(Continued)

OTHER PUBLICATIONS

Lewis, Peter A. "Colorants: Organic and Inorganic Pigments" Color for Science, Art and Technology, Chapter 10; Elsevier Science B.V.; K. Nassau (editor) (1998) pp. 283-312.*

(Continued)

*Primary Examiner* — Kaj K Olsen
*Assistant Examiner* — Ross J Christie
(74) *Attorney, Agent, or Firm* — Ostrolenk Faber LLP

(57) ABSTRACT

Multilayer pearlescent pigments based on platelet-shaped transparent substrates with an optically active coating, where the optically active coating includes at least
a) a nonabsorbing high-index layer A having a refractive index $n \geq 1.8$,
b) a low-index layer B having a refractive index $n < 1.8$ having an optical layer thickness $> 150$ nm,
c) an absorbing high-index layer C having a refractive index $n \geq 1.8$ and also,
d) optionally an outer protective layer D,
wherein the multilayer pearlescent pigments have a cumulative frequency distribution of the volume-averaged size distribution function, with the indices $D_{10}$, $D_{50}$, $D_{90}$ and a span $\Delta D$ of 0.7-1.4, the span $\Delta D$ being calculated in accordance with the formula $\Delta D = (D_{90} - D_{10})/D_{50}$. The disclosure further relates to a method for producing these multilayer pigments, and to their use.

19 Claims, 2 Drawing Sheets

(56) References Cited

U.S. PATENT DOCUMENTS

| | | | |
|---|---|---|---|
| 6,139,614 A | 10/2000 | Schmid et al. | |
| 6,620,233 B1 | 9/2003 | Seeger et al. | |
| 6,875,264 B2 | 4/2005 | Zimmermann et al. | |
| 6,949,138 B2 | 9/2005 | Nakamura et al. | |
| 7,077,897 B2 | 7/2006 | Brueckner et al. | |
| 7,396,401 B2 | 7/2008 | Jungnitz et al. | |
| 7,413,599 B2 | 8/2008 | Henglein et al. | |
| 7,517,404 B2 * | 4/2009 | Bujard et al. | 106/481 |
| 7,594,962 B2 * | 9/2009 | Bujard et al. | 106/481 |
| 7,604,862 B2 | 10/2009 | Ambrosius | |
| 7,691,196 B2 | 4/2010 | Pfaff et al. | |
| 2005/0013934 A1 * | 1/2005 | Xiong et al. | 106/415 |
| 2006/0042507 A1 * | 3/2006 | Bujard et al. | 106/415 |
| 2006/0042509 A1 | 3/2006 | Henglein et al. | |
| 2006/0257662 A1 * | 11/2006 | Bujard et al. | 106/482 |
| 2007/0259182 A1 * | 11/2007 | Bujard et al. | 106/404 |
| 2009/0169499 A1 * | 7/2009 | Bujard et al. | 106/482 |
| 2009/0258251 A1 | 10/2009 | Abe et al. | |
| 2009/0311209 A1 * | 12/2009 | Bujard | 106/441 |
| 2010/0203093 A1 * | 8/2010 | Bujard et al. | 106/403 |
| 2010/0297045 A1 | 11/2010 | Kaupp et al. | |

FOREIGN PATENT DOCUMENTS

| | | |
|---|---|---|
| DE | 10 2004 041 586 A1 | 3/2006 |
| EP | 0289240 A1 | 11/1988 |
| EP | 1474486 A2 | 11/2004 |
| EP | 1980594 B1 | 6/2009 |
| JP | 07246366 | 9/1995 |
| JP | 2000-044834 | 2/2000 |
| JP | A-2000-281932 | 10/2000 |
| JP | 2004-532284 | 10/2004 |
| JP | A-2005-502738 | 1/2005 |
| JP | A-2005-042112 | 2/2005 |
| JP | A-2007-126643 | 5/2007 |
| JP | A-2007-327059 | 12/2007 |
| JP | A-2008-174698 | 7/2008 |
| JP | 2008-546880 | 12/2008 |
| WO | WO 03/006558 A2 | 1/2003 |
| WO | WO 2004/056716 A1 | 7/2004 |
| WO | WO 2005/063637 A1 | 7/2005 |
| WO | WO 2006/021386 A1 | 3/2006 |
| WO | WO 2006/110359 A2 | 10/2006 |
| WO | WO 2006110359 A2 * | 10/2006 |
| WO | WO 2008/122420 A1 | 10/2008 |
| WO | WO 2009/103322 A1 | 8/2009 |

OTHER PUBLICATIONS

Byk-Gardner Katalog 2007/2008, p. 14, and an English translation thereof.
Communication from the European Patent Office regarding Intention to Grant dated Nov. 19, 2012 in corresponding European Patent Application No. 10 743 035.7 (with English language translation).
Notice of Reasons for Rejection dated Sep. 11, 2012 in corresponding Japanese Patent Application No. 2012-525071 (with English language translation).
Decision of Refusal dated May 14, 2013 in corresponding Japanese Patent Application No. 2012-525074 (English language translation).
International Preliminary Report on Patentability dated Feb. 21, 2012 in corresponding International Application No. PCT/EP2010/004864.
European Examination Report dated Jun. 13, 2012 in corresponding European Patent Application No. 10 743 035.7-1218 (with English translation).
Office Action dated Apr. 5, 2013 in U.S. Appl. No. 13/131,671.
Notice of Reasons for Rejection dated Dec. 3, 2013 in corresponding Japanese Patent Application No. 2012-525071 (with English language translation).
Notice of Reasons for Rejection dated Dec. 3, 2013 in corresponding Japanese Patent Application No. 2012-525072 (with English language translation).
Office Action dated Jul. 26, 2013 in corresponding Chinese Patent Application No. 201080006654.5 (with English language translation).

* cited by examiner

Effect of particle properties on laser diffraction

Particle properties:

d: diameter

1: diffraction

2: refraction

3: reflection

4: absorption

HIGH-GLOSS MULTILAYER EFFECT PIGMENTS HAVING A NARROW SIZE DISTRIBUTION, AND METHOD FOR THE PRODUCTION THEREOF

CROSS REFERENCE TO RELATED APPLICATIONS

The present application is a 35 U.S.C. §371 National Phase conversion of PCT/EP2010/004864, filed Aug. 9, 2010, which claims benefit of German Application No. 10 2009 037 932.0, filed Aug. 19, 2009, the disclosure of which is incorporated herein by reference. The PCT International Application was published in the German language.

TECHNICAL FIELD

The present invention relates to multilayer pearlescent pigments with improved optical properties, and to a method for producing the same, and to the use thereof in cosmetic formulations, plastics, films, textiles, ceramic materials, glasses, and coating compositions such as paints, printing inks, liquid inks, varnishes or powder coatings.

BACKGROUND

Multilayer pearlescent pigments are notable for particularly intense interference colors. The conventional construction of these multilayer pearlescent pigments encompasses a transparent substrate, which is coated with at least one layer sequence encompassing a high-(refractive-)index, low-index, and high-index layer.

In comparison to pearlescent pigments which have only one substrate coated with a single high-index layer, multilayer pearlescent pigments exhibit substantially narrower reflection bands in their reflection spectra and therefore develop a more intensely colored effect. The three-layer coating acts itself as an interference system, and with these multilayer pearlescent pigments, therefore, in contrast to conventional pearlescent pigments with only one single high-index layer, the optical properties of the substrate are less relevant. If the lower-index layer has an optical layer thickness (or path length) of >150 nm, then multilayer pearlescent pigments with color flop are obtained. If the optical layer thickness is below 150 nm, then bright multilayer pearlescent pigments with an intense interference color, but without color flop, are obtained.

JP 07246366 discloses a multiplicity of multilayer pearlescent pigments based on C glass.

DE 19525503 A1 discloses multilayer pearlescent pigments having a transparent low-index layer, followed by a selectively or nonselectively high-index layer DE 19953655 A1 discloses multilayer pearlescent pigments based on silicatic platelets having a first layer which is composed of $TiO_2$ and has been treated in a reducing atmosphere. This produced colored layers. Furthermore, the pearlescent pigments have a colorless low-index layer followed by a high-index layer comprising iron(III).

U.S. Pat. No. 6,875,264 B2 discloses multilayer pearlescent pigments having a layer construction which corresponds to a non-quarter wave stack.

EP 1474486 A2 discloses multilayer pearlescent pigments based on glass flake substrates.

The optical properties of effect pigments can be influenced, according to WO 2006/110359 A2, by a suitable particle size distribution. The glass flakes described here, classified and coated with a single metal oxide layer, have a $D_{10}$ of at least 9.5 µm, preferably of 9.5 µm. A disadvantage is that the pigments have to have a size range with a $D_{90}$ of not more than 85 µm, preferably of about 45 µm.

Disclosed in the prior art are diverse multilayer pearlescent pigments which possess appealing optical properties. Nevertheless, there continues to be a demand for improved products.

SUMMARY

It is an object of the present invention to provide multilayer pearlescent pigments having an enhanced luster. The multilayer pearlescent pigments ought additionally to have a higher chroma and, as far as possible, a higher color flop than the multilayer pearlescent pigments from the prior art.

A further object is to find a simple process for providing the multilayer pearlescent pigments of the invention.

The object is achieved through provision of multilayer pearlescent pigments based on platelet-shaped transparent substrates with an optically active coating, where the optically active coating comprises at least a) a nonabsorbing high-index layer A having a refractive index n≥1.8 b) a low-index layer B having a refractive index n<1.8 and having an optical layer thickness >150 nm c) an absorbing high-index layer C having a refractive index n≥1.8 and also d) optionally an outer protective layer D, and in that the multilayer pearlescent pigments have a cumulative frequency distribution of the volume-averaged size distribution function, with the indices $D_{10}$, $D_{50}$, $D_{90}$ and a span ΔD of 0.7-1.4, wherein the span ΔD is calculated in accordance with the formula $\Delta D=(D_{90}-D_{10})/D_{50}$.

Preferred developments are specified in subclaims 2 to 11.

The object is additionally achieved through provision of a method for producing the multilayer pearlescent pigments, that comprises the following steps:

(i) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span ΔD in the range of 0.7-1.4, the span ΔD being defined in accordance with the formula $\Delta D=(D_{90}-D_{10})/D_{50}$, (ii) applying at least the layers A to C to the platelet-shaped substrates, and also, optionally, at least one layer D, or (iii) applying at least the layers A to C to the platelet-shaped transparent substrates, and also, optionally, at least one layer D, (iv) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span ΔD in a range of 0.7-1.4, the span ΔD being defined in accordance with the formula $\Delta D=(D_{90}-D_{10})/D_{50}$.

The coating of the platelet-shaped transparent substrates preferably takes place in step (ii) after the size-classifying in step (i).

Further provided by the invention is the use of the multilayer pearlescent pigments of the invention in cosmetic formulations, plastics, films, ceramic materials, glasses, and coating compositions, such as paints, printing inks, liquid inks, varnishes, and powder coatings. The invention accordingly provides preparations which comprise the multilayer pearlescent pigments of the invention. The invention is also directed to articles which are provided—coated or printed, for example—with the multilayer pearlescent pigments of the invention. Accordingly, coated articles, such as bodyworks, facing elements, etc., or printed articles, such as paper, card, films, textiles, etc., are likewise part of the present invention.

DETAILED DESCRIPTION

The inventors have surprisingly observed that the multilayer pearlescent pigments of the invention, i.e. pearlescent pigments with the specified layer arrangement and a span $\Delta D=(D_{90}-D_{10})/D_{50}$ in the range from 0.7 to 1.4, exhibit an extremely strong gloss. According to a further variant of the invention, the multilayer pearlescent pigments of the invention also have a high chroma and a high color flop as well.

The provision of multilayer pearlescent pigments with a strong luster and also, preferably, a high chroma and color flop at the same time has not hitherto been possible in the art.

Surprisingly it has been found that multilayer pearlescent pigments based on substrates with a narrow span in the size distribution, coated with at least the optically active three-layer construction, exhibit a significantly higher luster and also higher chroma in relation to multilayer pearlescent pigments with a broader span, as is the case in the prior art.

The fact that the span $\Delta D$, as defined in claim 1, might have an effect on the luster is unexpected in view of the published prior art. The present invention therefore allows the provision of multilayer pearlescent pigments which have extremely appealing optical properties.

In the prior art, hitherto, the span $\Delta D$ was not recognized as an essential feature. Therefore, conventional multilayer pearlescent pigments have a broad span.

The particle size distribution is characterized in accordance with the invention by using the span $\Delta D$, defined as $\Delta D=(D_{90}-D_{10})/D_{50}$. The smaller the span, the narrower the particle size distribution.

Figure 1:
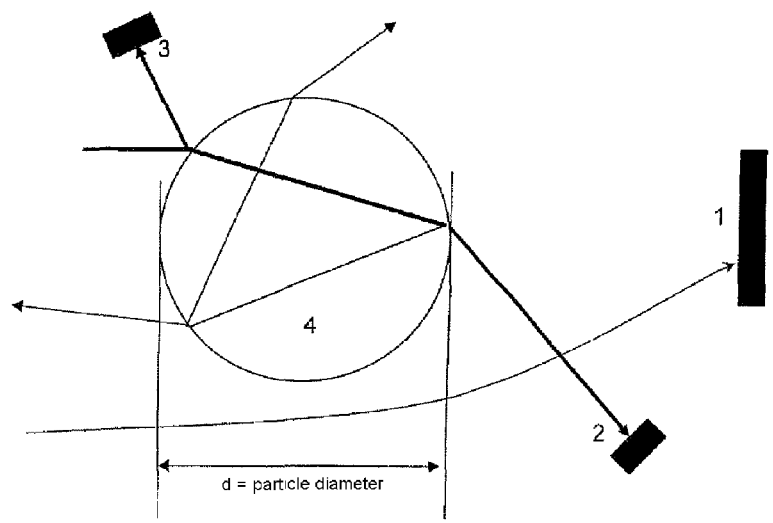
FIG. 1 shows the effect of particle properties on laser diffraction.

The $D_{10}$, $D_{50}$ or $D_{90}$ value in the cumulative frequency distribution of the volume-averaged size distribution function, as is obtained by laser diffraction methods, indicates that 10%, 50%, and 90%, respectively, of the multilayer pearlescent pigments have a diameter which is the same as or smaller than the respectively indicated value. In this case, the size distribution curve is determined using an instrument from Malvern (instrument: Malvern Mastersizer 2000) in accordance with manufacturer indications. In this instrument, the scattered light signals were evaluated in accordance with the theory of Mie, which also includes refraction and absorption behavior on the part of the particles (FIG. 1).

The multilayer pearlescent pigments of the invention possess a span $\Delta D$ in a range from 0.7 to 1.4, preferably in a range from 0.7 to 1.3, more preferably in a range from 0.8 to 1.2, very preferably in a range from 0.8 to 1.1. In further-preferred embodiments the span $\Delta D$ is in a range from 0.85 to 1.05.

Where the multilayer pearlescent pigments have a span $\Delta D$ of more than 1.4, the multilayer pearlescent pigments obtained are not highly lustrous. Multilayer pearlescent pigments below a span $\Delta D$ of 0.7 are very complicated to prepare by the usual techniques, and hence can no longer be produced economically.

The span $\Delta D$ of the platelet-shaped transparent substrate to be coated corresponds substantially to that of the multilayer pearlescent pigment of the invention and is ≤1.4, preferably ≤1.3, more preferably ≤1.2, very preferably ≤1.1, and especially preferably ≤1.05.

The multilayer pearlescent pigments of the invention may have any desired average particle size ($D_{50}$). The $D_{50}$ values of the multilayer pearlescent pigments of the invention are situated preferably within a range from 3 to 350 μm. The multilayer pearlescent pigments of the invention preferably have a $D_{50}$ value from a range from 3 to 15 μm or from a range from 10 to 35 μm or from a range from 25 to 45 μm or from a range from 30 to 65 μm or from a range from 40 to 140 μm or from a range from 135 to 250 μm.

The $D_{10}$ values of the multilayer pearlescent pigments of the invention encompass preferably a range from 1 to 120 μm. The multilayer pearlescent pigments of the invention preferably have the combinations of $D_{10}$, $D_{50}$, and $D_{90}$ values that are indicated in table 1. In this context, the $D_{10}$, $D_{50}$, and $D_{90}$ values of table 1 are combined only in such a way as to produce a span $\Delta D$ from a range from 0.7 to 1.4, preferably from a range from 0.7 to 1.3, more preferably from a range from 0.8 to 1.2, very preferably from a range from 0.8 to 1.1, and especially preferably from a range from 0.85 to 1.05. Combinations of $D_{10}$, $D_{50}$, and $D_{90}$ values that lead to a span $\Delta D$ which is not situated in the range from 0.7 to 1.4 are not inventive embodiments.

TABLE 1

| Preferred combinations of ranges of the $D_{10}$, $D_{50}$, and $D_{90}$ values | | |
|---|---|---|
| $D_{10}$ (μm) | $D_{50}$ (μm) | $D_{90}$ (μm) |
| 1-5 | 3-15 | 8-25 |
| 5-25 | 10-35 | 20-45 |
| 10-30 | 25-45 | 40-70 |
| 20-45 | 30-65 | 70-110 |
| 25-65 | 40-140 | 120-180 |
| 75-110 | 135-250 | 400-490 |

In this context it has emerged, surprisingly, that the size of the multilayer pearlescent pigments, characterized with the $D_{50}$ value, is not critical, and instead that the span $\Delta D=(D_{90}-D_{10})/D_{50}$ is in a narrow range from 0.7 to 1.4. The $D_{50}$ values of the multilayer pearlescent pigments may be, for example, 15, 20, 25 or 30 μm or else 50, 80, 100, 150, 200, 250, 300 or 350 μm.

It has emerged that, surprisingly, even in the case of a plurality of relatively large multilayer pearlescent pigments, highly lustrous and preferably highly chromatic multilayer pearlescent pigments can be obtained if the span $\Delta D$ is in a range from 0.7 to 1.4.

According to one further preferred embodiment of the invention, the multilayer pearlescent pigments have at least two interference colors. With this variant of the invention, therefore, there is an angle-dependent switch between two or more interference colors. When the viewing angle is changed, therefore, there is a change in the interference color—for example, from red to green or from blue to yellow. The multilayer pearlescent pigments of the invention according to this variant, therefore, exhibit an angle-dependent interference color switch, and may also be referred to as goniochromatic multilayer pearlescent pigments.

The transition between multilayer pearlescent pigments with no color flop, weak color flop, and intense color flop in dependence on the optical layer thickness of the low-index layer B is a fluid one. As the optical layer thickness of the low-index layer B goes up, from 150 nm onward, multilayer pearlescent pigments are first obtained which exhibit only a weak color flop, which ultimately, as the optical layer thickness of layer B keeps going up, turns into an intense color flop. An intense color flop typically extends over a plurality of quadrants in the CIELab color coordinate system.

According to a further preferred embodiment of the invention, the multilayer pearlescent pigments of the invention do not have a silver interference color. A feature of the multilayer pearlescent pigments of the invention is that they are colored preferably at a viewing angle near to the specular, but are not silver-colored. The multilayer pearlescent pigments of the invention therefore differ significantly from silver-colored interference pigments and metallic effect pigments, especially from silver-colored aluminum effect pigments.

The multilayer pearlescent pigments of the invention preferably have at least one interference color selected from the group consisting of yellow, violet, blue, red, green, and gradations thereof, but not encompassing a silver interference color. The interference color in question may range from dark to light.

The multilayer pearlescent pigments of the invention are notable for a strong luster and also, preferably, at the same time for a high chroma $C^*_{15}>20$ at an observation angle close to the specular angle.

The chroma values here are determined from the following applications: a nitrocellulose varnish (Dr. Renger Erco Bronzemischlack 2615e; Morton) containing 6% by weight of multilayer pearlescent pigments, the % by weight figure being based on the total weight of the varnish, is applied, depending on $D_{50}$ value, in a wet film thickness in accordance with table 2, to BYK-Gardner black/white drawdown charts (Byko-Chart 2853), and subsequently dried at room temperature. Then, using a BYK-MAC (BYK Gardner), colorimetric evaluations are performed on these drawdown charts, with measurement taking place on the black background of the drawdown chart. The incident angle is 45° and the chroma value employed is that at an observation angle of 15°.

TABLE 2

Wet film thickness as a function of the $D_{50}$ value of the multilayer pearlescent pigments

| $D_{50}$ value | Wire doctor |
|---|---|
| <40 μm | 36 μm |
| 40 μm-85 μm | 76 μm |
| >85 μm | 100 μm |

According to a preferred variant of the invention, the chroma $C^*_{15}$ of the multilayer pearlescent pigments of the invention is at least 22, preferably at least 24, even more preferably at least 25. A chroma in a range from 24 to 50 has proven to be very suitable.

The multilayer pearlescent pigments of the invention are prepared by providing the platelet-shaped substrates with at least one optically active coating which comprises a) a nonabsorbing high-index layer A having a refractive index n≥1.8 b) a low-index layer B having a refractive index n<1.8 and having an optical layer thickness >150 nm c) an absorbing high-index layer C having a refractive index n≥1.8 and also d) optionally an outer protective layer D. The layers A and B, and B and C, may be applied multiply below the outer protective layer D. It is preferred to apply, always in alternation, high-index and low-index layers to the substrate. With particular preference the platelet-shaped transparent substrate is coated only once with the layers A to C, optionally D.

In accordance with the invention, the layer A is internal in the layer arrangement, i.e., is facing the platelet-shaped transparent substrate; the layer B is situated between the layer A and the layer C, and the layer C, based on the platelet-shaped transparent substrate, is external in the layer arrangement.

Between the platelet-shaped transparent substrate and the layer A there may be one or more further, preferably substantially transparent, layers arranged. According to one preferred development, the layer A is applied directly to the platelet-shaped transparent substrate.

Between the layer A and the layer B, and also between the layer B and the layer C, there may be arranged, independently of one another, one or more further, preferably substantially transparent, layers. According to one preferred development, the layer B is applied directly to the layer A. According to another preferred development, the layer C is applied directly to the layer B.

With especial preference, the layer A is applied directly to the platelet-shaped transparent substrate, the layer B directly to the layer A, the layer C directly to the layer B, and also, optionally, the layer D directly to the layer C.

As optically active layers or coatings it is preferred to apply layers which comprise metal oxides, metal oxide hydrates, metal hydroxides, metal suboxides, metals, metal fluorides, metal oxyhalides, metal chalcogenides, metal nitrides, metal oxynitrides, metal sulfides, metal carbides or mixtures thereof. According to one preferred variant, the optically active layers or coatings consist of the aforementioned materials, metal oxides being particularly preferred.

The terms layers or coatings are used interchangeably for the purposes of this invention, unless otherwise indicated.

In the multilayer pigments of the invention, the optical effects are brought about by the layer structure having the layers A to C, on which incident light produces the perceptible color effects by physical effects such as reflection, interference, absorption, light diffraction, etc.

The optical thickness of the nonmetallic layers with high and low refractive indices determines the optical properties of the multilayer pearlescent pigments. The number and thickness of the layers can be set depending on the desired effect and the substrate used. If n is the refractive index of a layer and d is its thickness, the interference color in which a thin layer appears is given by the product of n and d, i.e., the optical thickness. The colors of such a film that come about in the reflecting light under normal light incidence result from a strengthening of the light of the wavelength $$\lambda = \frac{4}{2N-1} \cdot nd$$

and by attenuation of light of the wavelength $$\lambda = \frac{2}{N} \cdot nd,$$

where N is a positive integer. The variation in color that occurs with increasing film thickness results from the strengthening or attenuation of particular wavelengths of the light through interference.

In the case of multilayer pigments, the interference color is determined by the strengthening of particular wavelengths, and, if two or more layers in a multilayer pigment possess the same optical thickness, the color of the reflecting light becomes more intense as the number of layers increases ("quarter-wave-stack").

The high-index, nonabsorbing materials include, for example,
- metal oxides such as titanium dioxide, zirconium dioxide, zinc oxide, tin dioxide, antimony oxide, and mixtures thereof,
- metal hydroxides,
- metal oxide hydrates,
- metal sulfides such as zinc sulfide,
- metal oxyhalides such as bismuth oxychloride.

The nonabsorbing high-index layer A comprises preferably metal oxide layers. Preferred metal oxide layers encompass titanium oxide, more particularly $TiO_2$, zirconium oxide, preferably $ZrO_2$, zinc oxide, preferably ZnO, tin oxide, preferably $SnO_2$, or mixtures thereof. With particular preference the nonabsorbing high-index layer A is a layer which comprises $TiO_2$ or consists largely thereof. The $TiO_2$ may be present in the anatase, pseudobrookite or rutile modification. The $TiO_2$ is preferably in the anatase and/or the rutile modification, and very preferably in the rutile modification. In order to apply titanium oxide, preferably $TiO_2$, in the rutile form, it is possible first to apply tin oxide, preferably $SnO_2$, beneath the titanium oxide layer. The tin oxide may be present as a separate layer, with the layer thickness being able to be a few nanometers, for example less than 10 nm, more preferably less than 5 nm, even more preferably less than 3 nm.

The optical layer thickness of the layer A is preferably in a range from 30 to 900 nm, more preferably 40 to 880 nm, and more preferably 50 to 850 nm.

The layer thicknesses indicated in this application are, unless otherwise indicated, the optical layer thicknesses. By an optical layer thickness is meant, in accordance with the invention, the product of geometric layer thickness and the refractive index of the material which constitutes the layer. As the value for the refractive index of the material in question, the value known in each case from the literature is used.

In accordance with the invention, the geometric layer thickness is determined on the basis of SEM micrographs of ground sections of varnishes containing multilayer pearlescent pigments oriented plane-parallel to the substrate.

Below an optical layer thickness of 30 nm, the interference effect is too weak. Optical layer thicknesses above 900 nm are too thick overall and lead to a too high overall thickness on the part of the multilayer pearlescent pigment. Such multilayer pearlescent pigments are poorly oriented in the application medium, and therefore have disadvantages.

The low-index layer B generally has a refractive index n<1.8, preferably <1.7, and very preferably <1.6.

Nonabsorbing materials are suitable as low-index layer B. These materials include, for example,
- metal oxides such as silicon dioxide, aluminum oxide, boron oxide,
- metal oxide hydrates such as silicon oxide hydrate, aluminum oxide hydrate,
- metal fluorides such as magnesium fluoride,
- $MgSiO_3$.

The low-index metal oxide layer may optionally comprise alkali metal oxides and alkaline earth metal oxides as constituents.

The low-index layer B preferably comprises silicon dioxide. In one embodiment, the low-index layer B consists of silicon dioxide.

Since the layer B substantially determines the switch of the interference colors in the multilayer pearlescent pigments of the invention, the minimum optical layer thickness of the layer B is >150 nm for multilayer pearlescent pigments which exhibit a particularly pronounced color play and are therefore also preferred, and which have only one layer stack (B)+(C) on the layer A. The optical layer thickness of the layer B is preferably in a range from >150 nm to 500 nm, more preferably in a range from 180 nm to 480 nm, and very preferably in a range from 220 nm to 450 nm. Pigments of this kind exhibit a pronounced color flop.

The absorbing high-index layer C may, according to one embodiment, be selectively absorbing or nonselectively absorbing.

Examples of high-index materials suitable for the layer C include materials such as nonselectively absorbing metals, metal oxides, metal sulfides or mixtures thereof, which may also comprise selectively absorbing metal oxides, preferably in minor amount, and also selectively absorbing materials such as, more particularly, metal oxides, which generally in each case have a refractive index n≥1.8, preferably ≥1.9, and very preferably n≥2.0.

Examples of high-index, nonselectively absorbing materials include
- metals such as molybdenum, iron, tungsten, chromium, cobalt, nickel, silver, palladium, platinum, mixtures thereof or alloys thereof,
- metal oxides such as magnetite $Fe_3O_4$, cobalt oxide (CoO and/or $Co_3O_4$), vanadium oxide ($VO_2$ and/or $V_2O_3$), and also mixtures of these oxides with metals, more particularly magnetite and (metallic) iron,
- iron titanates such as ilmenite,
- metal sulfides such as molybdenum sulfide, iron sulfide, tungsten sulfide, chromium sulfide, cobalt sulfide, nickel sulfide, silver sulfide, tin sulfide, mixtures of these sulfides, mixtures of these sulfides with the respective metal, such as $MoS_2$ and Mo, and mixtures with oxides of the respective metal, such as $MoS_2$ and molybdenum oxides,
- nonabsorbing, colorless, high-index layers such as titanium dioxide or zirconium dioxide into which nonselectively absorbing material (e.g., carbon) has been incorporated or which are coated therewith.

Examples of suitable high-index, selectively absorbing materials include
- colored metal oxides or metal oxide hydrates such as iron (III) oxide (α- and/or γ-$Fe_2O_3$, red), FeO(OH) (yellow), chromium(III) oxide (green), titanium(III) oxide ($Ti_2O_3$, blue), vanadium pentoxide (orange),
- colored nitrides such as titanium oxynitrides and titanium nitride ($TiO_xN_y$, TiN, blue), the lower titanium oxides and nitrides generally being present in a mixture with titanium dioxide,
- metal sulfides such as cerium sulfide (red),
- iron titanates such as pseudobrookite (brownish red) and/or pseudorutile (brownish red),
- tin-antimony oxide $Sn(Sb)O_2$,
- nonabsorbing, colorless, high-index materials, e.g., metal oxides such as titanium dioxide and zirconium dioxide that are colored with selectively absorbing colorants. This coloration may be accomplished by incorporation of colorants into the metal oxide layer, by the doping thereof with selectively absorbing metal cations or colored metal oxides such as iron (III) oxide, or by coating of the metal oxide layer with a film comprising a colorant.

Selectively absorbing iron oxides are particularly preferably used for layer C.

The layer C may also comprise mixtures of different selectively and/or nonselectively absorbing components, preferably metal oxides. For example, the different components, preferably metal oxides, may be present in the form of a homogeneous mixture. It is also possible, however, for one component to be present in the other component in the form of a dope.

For example, in the layer C, there may be a nonabsorbing component present, titanium oxide for example, preferably $TiO_2$, as a dope in a selectively absorbing component, preferably $Fe_2O_3$, and/or in a nonselectively absorbing component, $Fe_3O_4$ for example. Alternatively, a selectively absorbing component, $Fe_2O_3$ for example, and/or a nonselectively absorbing component, $Fe_3O_4$ for example, may be present as a dope in a nonabsorbing component, titanium oxide for example, preferably $TiO_2$.

It is of course also possible that mixtures of more than two components, as demonstrated above, are present in the layer C.

Finally, in particular metals such as, for example, aluminum are also suitable for the layer C as nonselectively absorbing materials having absorption edges.

In the case of metals, the geometric layer thicknesses of the layer C are in a range from 10 to 50 nm, preferably from 15 to 30 nm: the layer thicknesses must be set such that the layers have semitransparent properties. The geometric layer thicknesses are therefore set depending on the metal used, so that the layer is partially transparent or semitransparent.

The optical layer thickness of the layer C is preferably in a range from 30 to 900 nm, more preferably in a range from 40 nm, to 880 nm, even more preferably in a range from 50 nm to 850 nm.

Where the layer C comprises a metal oxide and/or a metal sulfide, the optical layer thickness of this layer C is preferably in a range from 30 nm to 900 nm, preferably in a range from 40 nm to 880 nm, and more preferably in a range from 50 nm to 850 nm.

Suitable platelet-shaped transparent substrates to be coated are nonmetallic, natural or synthetic platelet-shaped substrates. The substrates are preferably substantially transparent, more preferably transparent, which means that they are at least partly transmissive to visible light.

According to one preferred embodiment of the invention, the platelet-shaped transparent substrates may be selected from the group consisting of natural mica, synthetic mica, glass flakes, $SiO_2$ platelets, $Al_2O_3$ platelets, polymer platelets, platelet-shaped bismuth oxychloride, platelet-shaped substrates comprising a hybrid organic-inorganic layer, and mixtures thereof. The platelet-shaped transparent substrates are preferably selected from the group consisting of natural mica, synthetic mica, glass flakes, $SiO_2$ platelets, $Al_2O_3$ platelets, and mixtures thereof. With particular preference the platelet-shaped transparent substrates are selected from the group consisting of natural mica, synthetic mica, glass flakes, and mixtures thereof. Especially preferred are glass flakes and synthetic mica, and mixtures thereof.

In contrast to synthetic platelet-shaped transparent substrates, natural mica possesses the disadvantage that contaminations, as a result of incorporated extraneous ions, may alter the hue, and that the surface is not ideally smooth but instead may have irregularities, such as steps, for example. Even when a natural substrate is used, however, it has surprisingly emerged that the luster of a plurality of multilayer pearlescent pigments can be increased when the span ΔD is in a range from 0.7 to 1.4, as compared with a plurality of conventional, broad-span multilayer pearlescent pigments.

Synthetic substrates such as, for example, glass flakes or synthetic mica, in contrast, have smooth surfaces, a uniform thickness within an individual substrate particle, and sharp edges. Consequently the surface offers only a few scattering centers for incident and reflected light, and accordingly, after coating, allows more highly lustrous multilayer pearlescent pigments than with natural mica as substrate. Glass flakes used are preferably those which are produced by the methods described in EP 0 289 240 A1, WO 2004/056716 A1, and WO 2005/063637 A1. The glass flake substrates which can be used may have, for example, a composition in accordance with the teaching of EP 1 980 594 B1.

The average geometric thickness of the platelet-shaped transparent substrates to be coated is in a range from 50 nm to 5000 nm, preferably in a range from 60 nm to 3000 nm, and more preferably in a range from 70 nm to 2000 nm. In one embodiment, the average geometric thickness for glass flakes as the substrate to be coated is in a range from 750 nm to 1500 nm. Glass flakes of this kind are available commercially on a broad basis. Further advantages are offered by thinner glass flakes. The thinner substrates result in a lower overall layer thickness of the multilayer pearlescent pigments of the invention. Preference is therefore likewise given to glass flakes whose average geometric thickness is in a range from 100 nm to 700 nm, more preferably in a range from 150 nm to 600 nm, very preferably in a range from 170 nm to 500 nm, and especially preferably in a range of 200 nm to 400 nm. In another embodiment, the average geometric thickness for natural or synthetic mica as the substrate to be coated is preferably in a range from 100 nm to 700 nm, more preferably in a range from 150 nm to 600 nm, very preferably in a range from 170 nm to 500 nm, and especially preferably in a range from 200 nm to 400 nm.

If platelet-shaped transparent substrates below an average geometric thickness of 50 nm are coated with high-index metal oxides, then the multilayer pearlescent pigments obtained are extremely fracture-sensitive, and may completely fragment even during incorporation into the application medium, with the consequence of a significant reduction in luster.

Above an average geometric substrate thickness of 5000 nm, the multilayer pearlescent pigments may become too thick overall. This is accompanied by a poorer specific opacity, i.e., surface area hidden per unit weight of multilayer pearlescent pigment of the invention, and also by a lower plane-parallel orientation in the application medium. The result of a poorer orientation, in turn, is a reduced luster.

The average geometric thickness of the platelet-shaped transparent substrate is determined on the basis of a cured varnish film in which the multilayer pearlescent pigments are aligned substantially plane-parallel to the substrate. For this purpose, a ground section of the cured varnish film is investigated under a scanning electron microscope (SEM), the geometric thickness of the platelet-shaped transparent substrate of 100 multilayer pearlescent pigments being determined and averaged statistically.

In a particularly preferred embodiment, the multilayer pearlescent pigments of the invention, which may also be referred to as goniochromatic multilayer pearlescent pigments, based on platelet-shaped glass flakes, have an optically active coating, wherein the optically active coating comprises a) a nonabsorbing high-index layer A having a refractive index n≥1.8 and preferably having an optical layer thickness in a range from 30 nm to 900 nm
b) a low-index layer B having a refractive index n<1.8 and preferably having an optical layer thickness in a range from >150 nm to 500 nm c) a selectively or nonselectively absorbing high-index layer C having a refractive index n≥1.8 and preferably having an optical layer thickness in a range from 30 nm to 900 nm.

In a very particularly preferred embodiment, the multilayer pearlescent pigments of the invention, based on platelet-shaped glass flakes, have an optically active coating, wherein the optically active coating comprises a) a nonabsorbing high-index $TiO_2$-comprising layer A having a refractive index n≥1.8 and preferably having an optical layer thickness in a range from 30 nm to 900 nm b) a low-index $SiO_2$-comprising layer B having a refractive index n<1.8 and preferably having an optical layer thickness in a range from >150 nm to 500 nm c) a selectively or nonselectively absorbing high-index iron oxide-comprising layer C having a refractive index n≥1.8 and preferably having an optical layer thickness in a range from 30 nm to 900 nm and also d) optionally an outer protective layer D.

These abovementioned multilayer pearlescent pigments have the indices $D_{10}$, $D_{50}$, $D_{90}$ from the cumulative frequency distribution of the volume-averaged size distribution function, with a span $\Delta D$ of 0.8-1.2, the span $\Delta D$ being calculated in accordance with the formula $\Delta D=(D_{90}-D_{10})/D_{50}$.

Multilayer pearlescent pigments of this kind have a surprisingly high luster and also a high chroma and a strong color flop.

According to one preferred embodiment, the multilayer pearlescent pigments do not have a silver interference color.

Multilayer pearlescent pigments with a silver interference color and chroma values $C^*_{15}\leq 20$ do not lead to multilayer pearlescent pigments with a strong chroma and a high color flop.

The multilayer pearlescent pigments may additionally be provided with at least one outer protective layer D, which further increases the stability of the multilayer pearlescent pigment with respect to light, weather and/or chemicals. The outer protective layer D may also be an aftercoat which facilitates the handling of the pigment on incorporation into different media.

The outer protective layer D of the multilayer pearlescent pigments of the invention may comprise or, preferably, consist of one or two metal oxide layers of the elements Si, Al or Ce. In one variant a silicon oxide layer, preferably $SiO_2$ layer, is applied as outermost metal oxide layer. Particular preference here is given to a sequence in which first of all a cerium oxide layer is applied, which is then followed by an $SiO_2$ layer, as described in WO 2006/021386 A1, the content of which is hereby incorporated by way of reference.

The outer protective layer D may additionally be organic-chemically modified on the surface. For example, one or more silanes may be applied to this outer protective layer. The silanes may be alkylsilanes having branched or unbranched alkyl radicals having 1 to 24 C atoms, preferably 6 to 18 C atoms.

The silanes may alternatively be organofunctional silanes which allow chemical attachment to a plastic, a binder of a paint or of an ink, etc.

The organofunctional silanes which are used preferably as surface modifiers and which have suitable functional groups are available commercially and are produced, for example, by Evonik and sold under the trade name "Dynasylan". Further products may be purchased from Momentive (Silquest silanes) or from Wacker, examples being standard silanes and α-silanes from the GENIOSIL product group.

Examples of these products are 3-methacryloyloxypropyl-trimethoxysilane (Dynasylan MEMO, Silquest A-174NT), vinyltri(m)ethoxysilane (Dynasylan VTMO or VTEO, Silquest A-151 or A-171), methyltri(m)ethoxysilane (Dynasylan MTMS or MTES), 3-mercaptopropyltrimethoxy-silane (Dynasylan MTMO; Silquest A-189), 3-glycidyloxy-propyltrimethoxysilane (Dynasylan GLYMO, Silquest A-187), tris[3-(trimethoxysilyl)propyl]isocyanurate (Silquest Y-11597), bis[3-(triethoxysilyl)propyl)]tetrasulfide (Silquest A-1289), bis[3-(triethoxy-silyl)propyl disulfide (Silquest A-1589, beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl) (m)-ethyldimethoxysilane (GENIOSIL XL 32, XL 34), (isocyanatomethyl)methyldimethoxysilane, (isocyanatomethyl)trimethoxysilane, 3-(triethoxysilyl)propyl-succinic anhydride (GENIOSIL GF 20), (methacryloyloxy-methyl) methyldiethoxysilane, 2-acryloyloxyethylmethyl-dimethoxysilane, 2-methacryloyloxyethyltrimethoxy-silane, 3-acryloyloxypropylmethyldimethoxysilane, 2-acryloyloxyethyltrimethoxysilane, 2-methacryloyloxy-ethyltriethoxysilane, 3-acryloyloxypropyltrimethoxy-silane, 3-acryloyloxypropyltripropoxysilane, 3-meth-acryloyloxypropyltriethoxysilane, 3-methacryloyloxy-propyltriacetoxysilane, 3-methacryloyloxypropylmethyl-dimethoxysilane, vinyltrichlorosilane, vinyltrimethoxy-silane (GENIOSIL XL 10), vinyltris(2-methoxyethoxy)silane (GENIOSIL GF 58), and vinyltriacetoxysilane.

As organofunctional silanes it is preferred to use 3-methacryloyloxypropyltrimethoxysilane (Dynasylan MEMO, Silquset A-174NT), vinyltri(m)ethoxysilane (Dynasylan VTMO or VTEO, Silquest A-151 or A-171), methyltri(m) ethoxysilane (Dynasylan MTMS or MTES), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxy-methyltri(m)ethoxysilane (GENIOSIL XL 33, XL 36), (methacryloyloxymethyl) (m)ethyldimethoxysilane (GENIOSIL XL 32, XL 34), 3-(triethoxysilyl)propyl-succinic anhydride (GENIOSIL GF 20), vinyltrimethoxy-silane (GENIOSIL XL 10) and/or vinyltris (2-methoxy-ethoxy)silane (GENIOSIL GF 58).

It is, however, also possible to apply other organo-functional silanes to the multilayer pearlescent pigments of the invention.

It is additionally possible to use aqueous prehydrolyzates that are obtainable, for example, commercially from Degussa. These include, among others, aqueous aminosiloxane (Dynasylan Hydrosil 1151), aqueous amino-/alkyl-functional siloxane (Dynasylan Hydrosil 2627 or 2909), aqueous diamino-functional siloxane (Dynasylan Hydrosil 2776), aqueous epoxy-functional siloxane (Dynasylan Hydrosil 2926), amino-/alkyl-functional oligosiloxane (Dynasylan 1146), vinyl-/alkyl-functional oligosiloxane (Dynasylan 6598), oligomeric vinylsilane (Dynasylan 6490) or oligomeric short-chain alkyl-functional silane (Dynasylan 9896).

In one preferred embodiment, the organofunctional silane mixture comprises at least one amino-functional silane as well as at least one silane without a functional binding group. The amino function is a functional group which is able to enter into one or more chemical interactions with the majority of groups that are present in binders. This may involve a covalent bond, such as with isocyanate functions or carboxylate functions of the binder, for example, or hydrogen bonds such as with OH functions or COOR functions, or else ionic interactions. An amino function is therefore very highly suitable for the purpose of the chemical attachment of the multilayer pearlescent pigment to different kinds of binders.

For this purpose it is preferred to take the following compounds: 3-aminopropyltrimethoxysilane (Dynasylan AMMO; Silquest A-1110), 3-aminopropyltriethoxysilane (Dynasylan AMEO), [3-(2-aminoethyl)aminopropyl]trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltri-methoxysilane (Silquest Y-9669), 4-amino-3,3-dimethyl-butyltrimethoxysilane (Silquest A-1637), N-cyclohexyl-aminomethylmethyldiethoxysilane (GENIOSIL XL 924), N-cyclohexylaminomethyltriethoxysilane (GENIOSIL XL 926), N-phenylaminomethyltrimethoxysilane (GENIOSIL XL 973), and mixtures thereof.

In a further-preferred embodiment, the silane without a functional binding group is an alkylsilane. The alkyl-silane preferably has the formula (A):

$$R_{(4-z)}Si(X)_z \qquad (A)$$

In this formula, z is an integer from 1 to 3, R is a substituted or unsubstituted, unbranched or branched alkyl chain having 10 to 22 C atoms, and X is a halogen group and/or alkoxy group. Preference is given to alkylsilanes having alkyl chains having at least 12 C atoms. R may also be joined cyclically to Si, in which case z is typically 2.

At or on the surface of the multilayer pearlescent pigments of the invention, in addition to the aforementioned silanes and silane mixtures, there may also be further organic-chemical modifiers arranged, such as, for example, substituted or unsubstituted alkyl radicals, polyethers, thioethers, siloxanes, etc., and mixtures thereof. It is, however, also possible for inorganic-chemical modifiers (e.g., $Al_2O_3$ or $ZrO_2$ or mixtures thereof) to be applied to the pigment surface, these modifiers being able, for example, to increase the dispersibility and/or compatibility in the respective application medium.

Via the surface modification it is possible, for example, to modify and/or set the hydrophilicity or hydrophobicity of the pigment surface. For example, via the surface modification, it is possible to modify and/or set the leafing or nonleafing properties of the multilayer pearlescent pigments of the invention. By leafing is meant that, in an application medium, such as a paint or a printing ink, for example, the multi-layer pearlescent pigments of the invention take up a position at or close to the interface or surface of the application medium.

The surface modifiers may also have reactive chemical groups, such as, for example, acrylate, methacrylate, vinyl, isocyanate, cyano, epoxy, hydroxyl or amino groups or mixtures thereof. These chemically reactive groups allow chemical attachment, especially formation of covalent bonds, to the application medium or to components of the application medium, such as binders, for example. By this means it is possible to make improvements in, for example, the chemical and/or physical properties of cured varnishes, paints or printing inks, such as resistance to environmental influences such as humidity, insolation, UV resistance, etc., or with respect to mechanical influences, examples being scratches, etc.

The chemical reaction between the chemically reactive groups and the application medium or components of the application medium may be induced, for example, by irradiation of energy, in the form of UV radiation and/or heat, for example.

For the incorporation of multilayer pearlescent pigments aftercoated with silanes and/or provided with an outer protective layer into cosmetic formulations it is necessary to ensure that the corresponding silane and/or the material of the outer protective layer is allowable in accordance with cosmetics law.

A method of the invention for producing the multilayer pearlescent pigments comprises the following steps:
(i) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range from 0.7-1.4, the span $\Delta D$ being defined in accordance with the formula $\Delta D = (D_{90} - D_{10})/D_{50}$,
(ii) applying at least the layers A to C to the platelet-shaped substrates, and also, optionally, at least one layer D,
or
(iii) applying at least the layers A to C to the platelet-shaped substrates, and also, optionally, at least one layer D,
(iv) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range from 0.7-1.4, the span $\Delta D$ being defined in accordance with the formula $\Delta D = (D_{90} - D_{10})/D_{50}$.

If the initial substrates are too large, it is possible, optionally, for a comminuting step to be carried out prior to the size-classifying.

The size-classifying may take place before or after the coating of the substrates. Advantageously, however, the substrate is first classified and then coated. Size-classifying is carried out, and optionally repeated, until the pearlescent pigments have the particle size distribution according to the invention.

In this case, the size distribution span for the substrates is measured and a final value is set which is equal to or less than the targeted span value of the multilayer pearlescent pigments.

A narrow span $\Delta D$ for the substrates may be achieved by suitable comminuting and/or classifying operations on the synthetic substrates to be coated. The synthetic substrates to be coated may be comminuted, for example, by ball mill, jet or agitator ball mill, edge-runner mill or dissolver. The span $\Delta D$ of the final fraction can be adjusted by appropriate classifying, such as a multiple wet screening, for example. Other classifying methods include centrifugation in cyclones or sedimentation from a dispersion.

The comminuting and classifying operations may take place in succession and optionally may be combined with one another. Hence a comminuting operation may be followed by a classifying operation, which is followed by a further comminuting operation on the fine fraction, and so on.

The metal oxide layers are preferably applied wet-chemically, in which case the wet-chemical coating methods developed for the production of pearlescent pigments may be employed. In the case of wet coating, the substrate particles are suspended in water and are admixed with one or more hydrolyzable metal salts or with a waterglass solution at a pH which is suitable for hydrolysis and which is selected such that the metal oxides and/or metal oxide hydrates are precipitated directly on the substrate to be coated, without any instances of secondary precipitation. The pH is typically held constant by simultaneous metered addition of a base and/or acid. The pigments are subsequently separated off, washed, dried at 50-150° C. for 6-18 hours, and optionally calcined for 0.5-3 hours, it being possible for the calcining temperature to be optimized in terms of the particular coating present. Generally speaking, the calcining temperatures are between 700 and 1000° C., preferably between 700 and 900° C. If desired, the pigments, following application of individual coatings, may be separated off, dried, and optionally calcined, before then being resuspended for the precipitation of the further layers.

The precipitation of the $SiO_2$ layer onto the substrate to be coated may be accomplished by addition of a potassium or sodium waterglass solution at a suitable pH. The $SiO_2$ layer may alternatively be applied via sol-gel methods, starting from alkoxysilanes, such as tetraethoxysilane, for example.

The multilayer pearlescent pigments of the invention can be used for producing pigment preparations and dry products.

The multilayer pearlescent pigments of the invention can also be used advantageously in blends with transparent and hiding white, chromatic, and black pigments, and also with other effect pigments.

Furthermore, the multilayer pearlescent pigments of the invention can be used, for example, in cosmetics formulations, plastics, ceramic materials, glasses, and coating compositions such as paints, printing inks, as for example for offset, screen, gravure, flexographic or security printing or for bronze printing, liquid inks, in toners, coating materials, e.g., auto finishes or powder coating materials, for the laser marking of paper and plastics, for seed coloring, for coloring foods or pharmaceutical products, or for coloring (agricultural) films, tarpaulins or textiles.

In cosmetics formulations, the multilayer pearlescent pigments of the invention can be combined with raw materials, auxiliaries, and actives that are suitable for the particular application. The concentration of the multilayer pearlescent pigments in the formulation may lie between 0.001% by weight for rinse-off products and 40.0% by weight for leave-on products.

The multilayer pearlescent pigments of the invention are suitable more particularly for use in cosmetics, such as, for example, body powders, face powders, pressed and loose powder, face makeup, powder cream, cream makeup, emulsion makeup, wax makeup, foundation, mousse makeup, rouge, eye makeup such as eyeshadow, mascara, eyeliners, liquid eyeliners, eyebrow pencil, lipcare stick, lipstick, lip gloss, lip liner, hairstyling compositions such as hairspray, hair mousse, hair gel, hair wax, hair mascara, permanent or semipermanent hair colors, temporary hair colors, skincare compositions such as lotions, gels, and emulsions, and also nail varnish compositions.

In order to obtain specific color effects it is possible, in the cosmetics applications, to use not only the multilayer pearlescent pigments of the invention but also further colorants and/or conventional effect pigments or mixtures thereof in variable proportions. Conventional effect pigments used may be, for example, commercial pearlescent pigments based on natural mica coated with high-index metal oxides (such as, for example, the Prestige product group from Eckart), BiOCl platelets, $TiO_2$ platelets, pearlescent pigments based on synthetic mica coated with high-index metal oxides or based on glass flakes coated with high-index metal oxides (such as, for example, the MIRAGE product group from Eckart), $Al_2O_3$, $SiO_2$ or $TiO_2$ platelets. Moreover, it is also possible for metallic effect pigments to be added, such as the Visionaire product group from Eckart, for example. The colorants may be selected from inorganic or organic pigments.

EXAMPLES

The invention is elucidated in more detail below through a number of examples, without being confined to these examples.

I PREPARATION OF THE PIGMENTS

A Classification of the Substrates

Inventive Example 1

Classification of Glass Flakes with Narrow Span $\Delta D=1.0$

A suspension of 200 g of glass flakes (GF100M from Glassflake Ltd) in FD water (FD=fully demineralized, approximately 3% by weight content) was classified on a 100 µm sieve, and the sieve undersize was sieved again on a 63 µm sieve. This sieving procedure was repeated twice with sieve residue obtained on the 63 µm sieve. This gave a glass flake fraction having the following particle size distribution (Malvern Mastersizer 2000): $D_{10}=50$ µm, $D_{50}=82$ µm, $D_{90}=132$ µm, span $\Delta D=1.0$.

Comparative Example 1

Classification of Glass Flakes with Broad Span $\Delta D=2.0$

A suspension of 200 g of glass flakes (GF 100M from Glassflake Ltd) in FD water (approximately 3% by weight content) was classified on a 150 µm sieve, and the sieve undersize was sieved again on a 34 µm sieve. This sieving procedure was repeated twice with sieve residue obtained on the 34 µm sieve. This gave a glass flake fraction having the following particle size distribution (Malvern Mastersizer 2000): $D_{10}=25$ µm, $D_{50}=88$ µm, $D_{90}=200$ µm, span $\Delta D=1.99$.

B Preparation of Single-Layer Pigments (Starting Material for Multilayer Pearlescent Pigments)

Comparative Example 2

Preparation of the Starting Material for Inventive Example 2

200 g of glass flakes from inventive example 1 were suspended in 2000 ml of FD water and heated to 80° C. with turbulent stirring. The pH of the suspension was adjusted to 1.9 using dilute HCl, and then a first layer of "$SnO_2$" was precipitated onto the glass flakes. This layer was formed by addition of a solution consisting of 3 g of $SnCl_4 \times 5 H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 75 ml of $TiCl_4$ (200 g $TiO_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color.

Comparative Example 3

Preparation of the Starting Material for Comparative Example 4

200 g of glass flakes from comparative example 1 were suspended in 2000 ml of FD water and heated to 80° C. with turbulent stirring. The pH of the suspension was adjusted to 1.9 using dilute HCl, and then a first layer of "$SnO_2$" was precipitated onto the glass flakes. This layer was formed by addition of a solution consisting of 3 g of $SnCl_4 \times 5\ H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 75 ml of $TiCl_4$ (200 g $TiO_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color.

C Preparation of the Multilayer Pearlescent Pigments

Inventive Example 2

Glass Flakes/$TiO_2$ (Rutile)/$SiO_2$/$Fe_2O_3$ 200 g of $TiO_2$-coated glass flakes from comparative example 2 were suspended in 1300 ml of FD water and heated to 80° C. with turbulent stirring. The pH was raised to 7.5 using 5% strength by weight NaOH solution, followed by stirring for 15 min. A waterglass solution (235 g of waterglass solution, 27% by weight $SiO_2$, mixed with 235 g of FD water) was then introduced slowly into the suspension and the pH was kept constant at 7.5. This was followed by stirring for a further 20 min, the pH was lowered to 3.0, and then a solution of 85 ml of $FeCl_3$ (280 g $Fe_2O_3$/l FD water) was metered into the suspension. During the addition, the pH was kept constant at 3.0 by counter-control with 10% strength by weight NaOH solution. This was followed by stirring for a further 15 minutes, by filtration, and by washing of the filtercake with FD water. The filtercake was initially dried at 100° C. and calcined at 650° C. for 30 min. This gave an extremely highly lustrous multilayer pigment with a reddish-golden interference color at the specular angle which, at the flat angle, tilts to a greenish gold. The pigment additionally has an inherent reddish colour.

Comparative Example 4

Glass Flakes/$TiO_2$ (Rutile)/$SiO_2$/$Fe_2O_3$ 200 g of $TiO_2$-coated glass flakes from comparative example 3 were suspended in 1300 ml of FD water and heated to 80° C. with turbulent stirring. The pH was raised to 7.5 using 5% strength by weight NaOH solution, followed by stirring for 15 min. A waterglass solution (235 g of waterglass solution, 27% by weight $SiO_2$, mixed with 235 g of FD water) was then introduced slowly into the suspension and the pH was kept constant at 7.5. This was followed by stirring for a further 20 min, the pH was lowered to 3.0, and then a solution of 85 ml of $FeCl_3$ (280 g $Fe_2O_3$/l FD water) was metered into the suspension. During the addition, the pH was kept constant at 3.0 by counter-control with 10% strength by weight NaOH solution. This was followed by stirring for a further 15 minutes, by filtration, and by washing of the filtercake with FD water. The filtercake was initially dried at 100° C. and calcined at 650° C. for 30 min. This gave a multilayer pigment with a black-reddish gold interference color at the specular angle which, at the flat angle, tilts slightly to a black gold tone. The pigment additionally has an inherent reddish color.

II PHYSICAL CHARACTERIZATION

IIa Angle-Dependent Color Measurements

For the measurement of the chroma values, the multilayer pearlescent pigments were incorporated by stirring, with a level of pigmentation of 6% by weight (based on the total weight of the wet varnish), into a conventional nitrocellulose varnish (Dr. Renger Erco Bronzemischlack 2615e; from Morton). The multilayer pearlescent pigments were introduced first and then dispersed into the varnish using a brush.

The completed varnish was applied on a drawdown apparatus (RK Print Coat Instr. Ltd. Citenco K 101), with a wet film thickness, depending on $D_{50}$ value of the multilayer pearlescent pigment, in accordance with table 2, onto Byk-Gardner black/white drawdown charts (Byko-Chart 2853), and subsequently dried at room temperature.

Using the multi-angle colorimeter Byk Mac (from Byk Gardener), with a constant incident angle of 45° (in accordance with manufacturer specifications), the L* and C* values were determined at different angles of observation relative to the specular angle. Particularly relevant were the observation angles relatively close to the specular angle, at 15° and −15°. The relevant chroma value of the multilayer pearlescent pigments of the invention was taken to be the $C^*_{15}$ value, which was measured at an angle removed by 15° from the specular.

Strongly reflecting samples (ideal mirror case) reflected virtually the entire incident light at the so-called specular angle. Here, the color of the interference color appeared most strongly. The further from the specular angle in the course of measurement, the less light and hence interference effect it was possible to measure.

IIb Gloss Measurements

The gloss is a measure of the directed reflection and can be characterized using a Micro-Tri-Gloss instrument. More strongly scattering samples therefore exhibit a low gloss.

The nitro varnish applications from IIa were subjected to measurement using a Micro-Tri-Gloss gloss meter from Byk Gardner at a measurement angle of 20° for high-gloss samples and at 60° for medium-gloss samples, on a black background. Where the gloss values at 60° were above 70 gloss units, the samples are measured at 20° (Byk-Gardner catalogue 2007/2008, p. 14).

IIc Particle Size Determination:

The size distribution curve was determined using an instrument from Malvern (instrument: Malvern Mastersizer 2000) in accordance with manufacturer indications. For this purpose, about 0.1 g of the pigment in question was placed in the form of an aqueous suspension, without addition of dispersing assistants, and with continual stirring with a Pasteur pipette, into the sample preparation cell of the measuring instrument, and subjected to repeated measurement. From the individual measurement results, the resultant averages were formed. The scattered light signals in this case were evaluated in accordance with the theory of Mie, which also includes refraction and absorption behavior of the particles (FIG. 1).

The average size $D_{50}$ refers in the context of this invention to the $D_{50}$ value of the cumulative undersize curve of the volume-averaged size distribution function, as obtained by laser diffraction methods. The $D_{50}$ value indicates that 50% of the pigments have a diameter which is the same as or smaller than the stated value, for example 20 µm.

Accordingly, the $D_{90}$ value indicates that 90% of the pigments have a diameter which is the same as or smaller than the value in question.

Additionally, the $D_{10}$ value indicates that 10% of the pigments have a diameter which is the same as or smaller than the value in question.

The span ΔD, defined as $\Delta D=(D_{90}-D_{10})/D_{50}$, gives the breadth of the distribution.

III EVALUATION

TABLE 3

Characterization of the effect pigments

| Effect pigment | Construction | Gloss, 20° | $C^*_{15}$ | Span |
|---|---|---|---|---|
| Inventive example 2 | Glass flake/TiO$_2$/ SiO$_2$/Fe$_2$O$_3$ | 103.2 | 29.9 | 1.1 |
| Comparative example 4 | Glass flake/TiO$_2$/ SiO$_2$/Fe$_2$O$_3$ | 70.7 | 12.6 | 2.0 |

From the data in table 3 it can clearly be seen that the inventive example 2, with the layer construction glass flake/TiO$_2$/SiO$_2$/Fe$_2$O$_3$ and a low span, has a significantly increased gloss and a markedly higher chroma at the 15° angle compared to comparative example 4.

Figure 2:
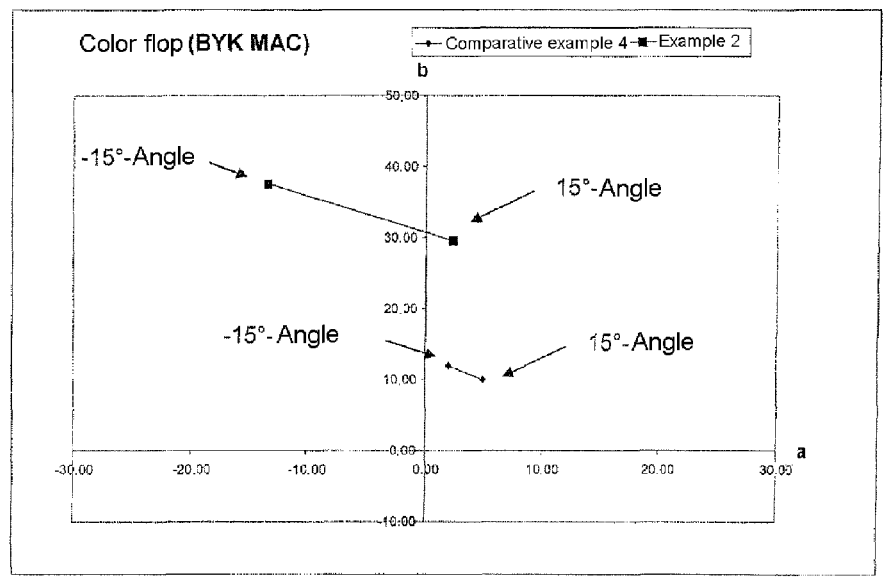
FIG. 2 shows that inventive Example 2 has a markedly higher color flop than Comparative Example 4.

Furthermore, the inventive example 2 has a markedly higher color flop, as can be seen in FIG. 2. In this case, the flop extends from the 1$^{st}$ to the 2$^{nd}$ quadrant of the CIELab color coordinate system, while the comparative example 4 only shows a weak color flop.

IV. PERFORMANCE EXAMPLES

In the cosmetic application examples below, the inventive multilayer pearlescent pigments produced by one of the above examples were used.

Example 3

Transparent Lipstick

| INCI Name | Product name | % by weight | Supplier |
|---|---|---|---|
| Phase A | | 100.00 | |
| Ethylenediamine/ Hydrogenated Dimer Dilinoleate Copolymer Bis-Di-C14-18 Alkyl Amide | Sylvaclear A2614V | 28.00 | www.arizonachemical.com |
| Bis-Stearyl Ethylenediamine/ Neopentyl Glycol/ Hydrogenated Dimer Dilinoleate | Sylvaclear C75V | 28.00 | www.arizonachemical.com |
| Paraffinum Liquidum | Paraffinum Liquidum | 13.80 | www.heess.de |
| Macadamia Integrifolia Seed Oil | Floramac Hawaiian Macadamia Oil-Refined | 10.00 | www.floratech.com |
| Isopropyl Myristate | Isopropyl Myristate | 6.00 | www.vwr.com |
| C12-15 Alkyl Benzoate | Sympatens-LBZ | 6.00 | www.kolb.ch |
| Caprylic/Capric Triglyceride | Miglyol 812 | 7.00 | www.sasolwax.com |
| Propylparaben | Propyl-4-hydroxy-benzoate | 0.20 | www.sigmaaldrich.com |
| Phase B | | | |
| Multilayer pearlescent pigment | Multilayer pearlescent pigment | 1.00 | |

The multilayer pearlescent pigment may be used in a range from 0.01% to 5.0% by weight. The balance can be made up with Paraffinum Liquidum.

Phase A was heated to 85° C., then phase B was added to phase A and the phases were mixed. The mixture, with a temperature of 75° C., was subsequently introduced into a lipstick mold.

Example 4

Cream Eyeshadow

| INCI name | Product name | wt % | Supplier |
|---|---|---|---|
| Phase A | | 100.00 | |
| Castor oil | Castor oil | 28.70 | www.riedeldehaen.com |
| Octyl palmitate | Liponate EHP | 6.00 | www.lipochemicals.com |
| Cocos Nucifera (coconut) oil | Lipovol C-76 | 7.00 | www.lipochemicals.com |
| Beeswax | Ewacera 12 | 6.00 | www.wagnerlanolin.com |
| Isopropyl lanolate | Ewalan IP | 5.00 | www.wagnerlanolin.com |
| Persea gratissima (avocado) oil and hydrogenated avocado oil | Avocado butter | 7.00 | www.impag.de |
| Magnesium stearate | Magnesium stearate | 3.00 | www.sigmaaldrich.com |
| Bis-hydroxyethoxy-propyl dimethicone | Dow Corning 5562 carbinol fluid | 7.00 | www.dowcorning.com |
| Dimethicone/vinyl dimethicone crosspolymer and silica | Dow Corning 9701 cosmetic powder | 5.00 | www.dowcorning.com |
| Phenoxyethanol (and) methylparaben (and) ethylparaben (and) butylparaben | Uniphen P-23 | 0.30 | www.induchem.com |
| Phase B | | | |
| Multilayer pearlescent pigment | Multilayer pearlescent pigment | 25.00 | |

The multilayer pearlescent pigment can be used in a range from 5.0% to 30.0% by weight. The balance can be made up with castor oil.

Phase A was mixed and heated to 85° C., the ingredients of phase B were likewise mixed together, and then were added to phase A with stirring. After being dispensed into an appropriate container, the mixture was cooled to room temperature.

Example 5

Shower Gel

| INCI Name | Product name | % by weight | Supplier |
|---|---|---|---|
| Phase A | | 100.00 | |
| Multilayer pearlescent pigment | Multilayer pearlescent pigment | 0.01 | |
| Aqua | Water | 68.21 | |
| Blue (0.5% by weight aqueous solution) | Blue 1 | 0.10 | www.sunchemicals.com |
| Acrylates/C10-30 Alkyl Acrylate Crosspolymer | Carbopol ETD 2020 | 1.00 | ww.noveon.com |
| Propylene Glycol | 1,2-Propanediol | 1.00 | www.vwr.com |
| Phase B | | | |
| TEA-Lauryl Sulfate | Texapon T 42 | 22.00 | www.cognis.com |
| Cocamide DEA | Rewomid DC 212 S | 3.00 | www.degussa.com |
| Cocamidopropyl Betaine | Tego Betain F 50 | 4.00 | www.cognis.com |
| Disodium EDTA | Edeta BD | 0.05 | www.basf.com |
| Phase C | | | |
| Triethanolamine | Triethanolamine | 0.30 | www.vwr.com |
| Phenoxyethanol, Ethylhexylglycerin | Euxyl PE 9010 | 0.60 | www.schuelke.com |

The multilayer pearlescent pigment can be used in a range from 0.01% to 1.0% by weight. The balance can be made up with water.

Carbopol was dispersed in phase A, and the mixture was stirred for 15 minutes and heated to 65° C. Thereafter the raw materials of phase B were added individually to phase A with slow stirring. The mixture was subsequently cooled to 40° C. and phase C was added.

Example 6

Pressed Eyeshadow

| INCI Name | Product name | % by weight | Supplier |
|---|---|---|---|
| Phase A | | 100.00 | |
| Mica | Silk Mica | 17.00 | www.vwr.com |
| Boron Nitride | Softouch CCS 102 | 2.50 | www.advceramicscos.com |
| Zinc Stearate | Kemilub EZ-V | 7.00 | www.undesa.com |
| Talc | Talc Powder | 38.50 | www.riedeldehaen.com |
| Multilayer pearlescent pigment | Multilayer pearlescent pigment | 25.00 | |
| Phase B | | | |
| Dimethicone | Dow Corning 200 Fluid 5 cst. | 5.00 | www.dowcorning.com |
| Cyclomethicone (and) Dimethicone Crosspolymer | Dow Corning 9040 Elastomer | 5.00 | www.dowcorning.com |

The multilayer pearlescent pigment can be used in a range from 5.0% to 40.0% by weight. The balance can be made up with talc.

Phase A was mixed for 30 s at 2500 rpm in a high-speed mixer. Then phase B was added and the mixture was mixed in the same mixer at 3000 rpm for 60 s. Lastly the powder mixture was shaped by pressing in an eyeshadow press at 150 bar for 30 s.

Example 7

Lip Gloss

| INCI name | Product name | wt % | Supplier |
|---|---|---|---|
| Phase A | | 100.00 | |
| Hydrogenated polyisobutene (and) ethylene/propylene/styrene copolymer (and) butylene/ethylene/styrene copolymer | Versagel ME 750 | 78.90 | www.penreco.com |
| Simmondsia Chinensis (jojoba) seed oil | Jojoba oil-natural/golden | 2.00 | www.biochemica.com |
| Caprylyl trimethicone | Silcare Silicone 31M50 | 7.00 | www.clariant.com |
| Stearyl dimethicone | Silcare Silicone 41M65 | 3.20 | www.clariant.com |
| Hydrogenated polydecene | Nexbase 2002 | 4.00 | www.jandekker.com |
| Isopropyl myristate | Isopropyl myristate | 4.50 | www.vwr.com |
| Phase B | | | |
| Multilayer pearlescent pigment | Multilayer pearlescent pigment | 0.20 | |
| Propylparaben | Propyl-4-hydroxy-benzoate | 0.20 | www.sigmaaldrich.com |

The multilayer pearlescent pigment can be used in a range from 0.01% to 0.50% by weight. The balance can be made up with Versagel ME 750.

Phase A was heated to 85° C., and then the ingredients of phase B were added individually to phase A and the mixture was stirred until its consistency was uniform, at which point it was dispensed into a lip gloss vessel.

Example 8

Nail Varnish

| INCI Name | Product name | % by weight | Supplier |
|---|---|---|---|
| Phase A | | 100.00 | |
| Multilayer pearlescent pigment | Multilayer pearlescent pigment | 2.00 | |
| Phase B | | | |
| Butylacetate (and) Ethylacetate (and) Nitrocellulose (and) Isopropyl Alcohol | International Lacquers Nailpolish & Care Base 359 | 98.00 | www.internationallacquers.lu |

The multilayer pearlescent pigment can be used in a range from 0.1% to 10.0% by weight. The balance can be made up with International Lacquers Nailpolish.

Phase A and phase B were mixed and then introduced into an appropriate container.

What is claimed is:

1. Multilayer pearlescent pigments based on platelet-shaped transparent substrates with an optically active coating, wherein the optically active coating comprises at least
    a) a nonabsorbing high-index layer A having a refractive index $n \geq 1.8$
    b) a low-index layer B having a refractive index $n < 1.8$ having an optical layer thickness >150 nm
    c) an absorbing high-index layer C having a refractive index $n \geq 1.8$ and also
    d) optionally an outer protective layer D,
    and wherein the multilayer pearlescent pigments have a cumulative frequency distribution of a volume-averaged size distribution function, with indices $D_{10}, D_{50}, D_{90}$ and a span $\Delta D$ of 0.7-1.4, the span $\Delta D$ being calculated in accordance with the formula $\Delta D=(D_{90}-D_{10})/D_{50}$, wherein said multilayer pearlescent pigments have chroma values $C^*_{15}$ of at least 22.

2. The multilayer pearlescent pigments of claim 1, wherein the multilayer pearlescent pigments do not have a silver interference color.

3. The multilayer pearlescent pigments of claim 1, wherein the multilayer pearlescent pigments have a span $\Delta D$ of 0.7-1.3.

4. The multilayer pearlescent pigments of claim 1, wherein an optical layer thickness of layer A is in a range from 30 nm to 900 nm.

5. The multilayer pearlescent pigments of claim 1, wherein the optical layer thickness of layer B is in a range from >150 nm to 500 nm.

6. The multilayer pearlescent pigments of claim 1, wherein layer C comprises a metal oxide or a metal sulfide.

7. The multilayer pearlescent pigments of claim 1, wherein an optical layer thickness of layer C is in a range from 30 nm to 900 nm.

8. The multilayer pearlescent pigments of claim 1, wherein layer A comprises a titanium oxide.

9. The multilayer pearlescent pigments of claim 1, wherein layer B comprises a silicon oxide.

10. The multilayer pearlescent pigments of claim 1, wherein layer C comprises iron oxide or a mixture of different iron oxides, of which at least one iron oxide is absorbing iron oxide.

11. The multilayer pearlescent pigments of claim 1, wherein the platelet-shaped transparent substrates of the multilayer pearlescent pigments are selected from the group consisting of natural mica, synthetic mica, glass flakes, $SiO_2$ platelets, $Al_2O_3$ platelets, and mixtures thereof.

12. A method for producing the multilayer pearlescent pigments of claim 1, wherein the method comprises the following steps:
    (i) size-classifying platelet-shaped transparent substrates to be coated, so that the platelet-shaped transparent substrates to be coated have a volume-averaged size distribution function with the characteristics $D_{10}, D_{50}, D_{90}$, and a span $\Delta D$ in a range from 0.7-1.4, the span $\Delta D$ being defined in accordance with the formula $\Delta D=(D_{90}-D_{10})/D_{50}$, and
    (ii) applying at least the layers A to C to the platelet-shaped substrates, and also, optionally, at least one layer D,
    or
    (iii) applying at least the layers A to C to the platelet-shaped transparent substrates, and also, optionally, at least one layer D, and
    (iv) size-classifying platelet-shaped transparent substrates to be coated, so that the platelet-shaped transparent substrates to be coated have a volume-averaged size distribution function with the characteristics $D_{10}, D_{50}, D_{90}$, and a span $\Delta D$ in a range from 0.7-1.4, the span $\Delta D$ being defined in accordance with the formula $\Delta D=(D_{90}-D_{10})/D_{50}$.

13. A formulation comprising the multilayer pearlescent pigments of claim 1.

14. An article, wherein the article comprises the multilayer pearlescent pigments of claim 1.

15. The multilayer pearlescent pigments of claim 8, wherein the titanium oxide is titanium dioxide.

16. The multilayer pearlescent pigments of claim 9, wherein the silicon oxide is $SiO_2$.

17. The multilayer pearlescent pigments of claim 1, wherein said multilayer pearlescent pigments have chroma values $C^*_{15}$ of at least 24.

18. The multilayer pearlescent pigments of claim 1, wherein said multilayer pearlescent pigments have chroma values $C^*_{15}$ of at least 25.

19. The multilayer pearlescent pigments of claim 1, wherein said multilayer pearlescent pigments have chroma values in a range of from 24 to 50.

* * * * *